United States Patent
Engel

(10) Patent No.: US 6,707,652 B2
(45) Date of Patent: Mar. 16, 2004

(54) ELECTRICAL SWITCHING APPARATUS INCLUDING GLOWING CONTACT PROTECTION

(75) Inventor: Joseph C. Engel, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/192,580

(22) Filed: Jul. 10, 2002

(65) Prior Publication Data

US 2004/0008460 A1 Jan. 15, 2004

(51) Int. Cl.$^7$ ................................................ H02H 9/08
(52) U.S. Cl. ....................................................... 361/42
(58) Field of Search ............................. 361/42, 45, 49, 361/79, 87, 93, 103

(56) References Cited

U.S. PATENT DOCUMENTS

| | | |
|---|---|---|
| 3,878,435 A | 4/1975 | Van Zeeland et al. |
| 4,081,852 A | 3/1978 | Coley et al. |
| 4,561,120 A * | 12/1985 | Andow et al. ............... 359/177 |
| 4,688,134 A * | 8/1987 | Freeman et al. ............... 361/45 |
| 4,901,060 A * | 2/1990 | Liu ............................. 340/598 |
| 5,224,006 A * | 6/1993 | MacKenzie et al. .......... 361/45 |
| 5,260,676 A | 11/1993 | Patel et al. |
| 5,293,522 A | 3/1994 | Fello et al. |
| 5,341,191 A | 8/1994 | Crookston et al. |
| 5,341,268 A * | 8/1994 | Ishiguro et al. ............... 361/62 |
| 5,579,195 A * | 11/1996 | Nishijima et al. ............. 361/62 |
| 5,805,400 A * | 9/1998 | Kim ............................. 361/71 |
| 5,825,602 A * | 10/1998 | Tosaka et al. ................ 361/94 |
| 5,889,643 A | 3/1999 | Elms |
| 5,933,306 A * | 8/1999 | Santos et al. ................ 361/45 |
| 5,973,899 A * | 10/1999 | Williams et al. .............. 361/72 |
| 6,049,143 A * | 4/2000 | Simpson et al. ............ 307/126 |
| 6,434,715 B1 * | 8/2002 | Andersen ..................... 714/39 |

OTHER PUBLICATIONS

Sletbak, J. et al., "Glowing Contact Areas in Loose Copper Wire Connections", IEEE, 1991, pp. 244–248.
Hagimoto, Yasuaki, "Japanese Reports on Electrical Fire Causes", http://members.ozemail.com.au/~tcforen/japan/index.html, 1996, 12 pp.

* cited by examiner

Primary Examiner—Gregory J. Toatley, Jr.
Assistant Examiner—Danny Nguyen
(74) Attorney, Agent, or Firm—Martin J. Moran

(57) ABSTRACT

An electrical switching device, such as a receptacle, includes a line circuit having a first temperature, a neutral circuit having a second temperature, and a load terminal. Separable contacts are adapted to electrically connect the line circuit and the load terminal. An operating mechanism opens the separable contacts in response to a trip signal. A first diode temperature sensor outputs a first signal representative of the first temperature of the line circuit. A second diode temperature sensor outputs a second signal representative of the second temperature of the neutral circuit. A difference circuit determines a difference between the first and second signals. A trip circuit provides the trip signal as a function of the difference.

6 Claims, 4 Drawing Sheets

ELECTRICAL SWITCHING APPARATUS INCLUDING GLOWING CONTACT PROTECTION

BACKGROUND OF THE INVENTION

1. Field of the Invention

The invention is directed to electrical switching apparatus and, more particularly, to electrical switching apparatus such as, for example, receptacles including terminals, such as screw terminals, for electrical conductors, such as copper wiring.

2. Background Information

Electrical switching apparatus include, for example, circuit switching devices and circuit interrupters such as circuit breakers, contactors, motor starters, motor controllers and other load controllers.

Circuit breakers are generally old and well known in the art. An example of a circuit breaker is disclosed in U.S. Pat. No. 5,341,191. Circuit breakers are used to protect electrical circuitry from damage due to an overcurrent condition, such as an overload condition or a relatively high level short circuit or fault condition. Molded case circuit breakers, for example, include at least one pair of separable contacts which are operated either manually by way of a handle disposed on the outside of the case or automatically by way of an internal trip unit in response to an overcurrent condition.

Ground fault circuit interrupters (GFCIs) include ground fault circuit breakers (GFCBs), ground fault switches and other ground fault contactors, motor starters, motor controllers and other load controllers.

Arc fault circuit interrupters (AFCIs) include arc fault circuit breakers (AFCBs), arc fault switches and other arc fault contactors, motor starters, motor controllers and other load controllers.

Ground fault and/or arc fault switches include ground fault and/or arc fault receptacles (GFRs/AFRs), and cord-mounted or plug-mounted ground fault and/or arc fault protection devices (e.g., ground fault and/or arc fault protection circuitry at the alternating current (AC) plug end of the AC power cord of an appliance, such as a hair dryer).

A typical GFCI includes an operational amplifier, which amplifies a sensed ground fault signal and applies the amplified signal to a window comparator. The window comparator compares the amplified signal to positive and negative reference values. If either reference value is exceeded in magnitude, a trip signal is generated.

A GFCI may employ, for example, the well known dormant oscillator technique for sensing a load side grounded-neutral condition, without requiring a connected load. Two magnetic elements are employed. The first magnetic element is a differential current transformer, which produces an output proportional to the difference in the current flowing to the load through the line conductor and the current returning from the load through the neutral conductor. The difference is the ground current. The second magnetic element is a voltage transformer, the primary of which is energized by the output of a ground fault sense amplifier, which is part of the GFCI electronics. The transformer has two single turn secondaries formed by passing line and neutral conductors through its core. The polarities of the primary and secondary windings of the transformer are such that the ground fault sense amplifier output induces a voltage on the secondary of transformer, such as the neutral conductor, which voltage increases the ground current caused by a load neutral-to-ground fault. This increased ground current increases the sense amplifier output, thereby resulting in a positive feedback condition increase in the ground current. If the load neutral-to-ground impedance is less than about 2 ohms, this positive feedback may become unstable, which results in a monotonic increase in the induced ground fault current in the neutral conductor until the ground fault trip level is exceeded and the receptacle trips. Both conductors are passed through the core to cover the case where the input leads are reversed.

A glowing contact is a high resistance connection, which can form at the interface of a copper wire and a screw terminal, for example, of a receptacle. The resulting temperature rise at this connection point can melt the wire's insulation and damage the receptacle. It is desirable to be able to detect this condition and interrupt the current before the glowing contact fault progresses to a hazardous condition.

The hazard associated with aluminum wiring has been known and understood for thirty years. The connection of an aluminum wire conductor to the terminal of a wiring device is unstable, since the aluminum, over time, tends to flow, thus, making the aluminum wire-to-terminal a high resistance connection. The resulting $I^2R$ heating causes local heating that can melt the wire's insulation and the receptacle. It was believed that simply returning to copper wire would resolve this problem. Unfortunately, this is not true. Furthermore, most people, outside of the standards and wiring device industry, are unaware of the glowing contact problem. Also, the lack of wide spread public knowledge of the glowing contact problem may follow from the fact that there has been no known solution to this problem.

It is very easy to create a high resistance or glowing contact at a receptacle terminal using copper wire. See, for example, Sletbak, J., et al., *"Glowing Contact Areas in Loose Copper Wire Connections,"* IEEE, 1991, pp. 244–48.

The hazards associated with glowing contacts, including contacts made with all combinations of copper, brass and iron are known. See Yasuaki Hagimoto, *"Japanese Reports on Electrical Fire Causes,"* http://members.ozemail.com.au/~tcforen/japan/index.html, 1996, 12 pp.

In a similar manner that aluminum oxide creates the aluminum wire problem, the culprit associated with a glowing contact is copper oxide. There are two recognized mechanisms for creating a high resistance copper oxide contact: arcing; and fretting. The arcing mechanism involves, for example, a loose receptacle screw terminal and slight movement of the wire while it is carrying a current. Every time the electrical connection is broken, a single electrical arc discharge can occur.

FIG. 1 shows the voltage across the terminal-to-wire connection in the upper trace (about 170 V peak) and the current through that connection in the lower trace (about 15 A peak) for different intervals of an electrical connection being broken while carrying current. This pair of voltage and current traces is broken into three intervals I,II,III. The first interval I shows normal operation in which there is negligible voltage across the terminal-to-wire connection, which has a relatively low resistance, with an alternating current flowing through that connection. During the second interval II, there is a significant increase in the resistance of the terminal-to-wire connection, due to a single arcing half cycle. Hence, there is a corresponding significant increase in the voltage across the terminal-to-wire connection, along with a corresponding reduction in the magnitude of the alternating current flowing through that connection. Finally, during the third interval III, the terminal-to-wire connection becomes an open circuit and the voltage across the terminal-to-wire connection is the line voltage. As a result of the open circuit, there is essentially no current flowing through that connection.

While there is essentially very little power dissipated in the terminal-to-wire connection during the first and third intervals I,III, relatively significant arcing and power dissipation occurs in the second interval II. To the extent that the second interval II may become relatively periodic or persistent, then oxidation can occur at the copper wire-screw interface where the half cycle arcing has occurred with each breaking of the wire-screw connection. This copper oxide layer at the wire-screw interface can also occur due to the mechanism of fretting or a rubbing action with no arcing.

By Paschen's laws, it is not possible to create a sustained copper-to-copper through air arc discharge in a 120 $V_{RMS}$ circuit with a resistive load. An arc is formed when the contact breaks, although it extinguishes at the first zero current crossing, since the voltage is too small for a "re-strike". This is sometimes called a "spark" rather than an "arc". There can be a spark whenever an electrical contact is broken due to local heating at the break point. Hence, an inductive load is needed for an arc in most 120 $V_{RMS}$ residential wiring, other than a 240 $V_{RMS}$ circuit. Otherwise, with a resistive load, a peak voltage of about 300 volts is needed in order to create a sustained arcing event as compared to an available peak value of about 170 volts for a 120 $V_{RMS}$ circuit.

Each single arc discharge forms a small amount of copper oxide ($Cu_2O$) at the terminal-to-copper wire interface. With repeated discharges, the amount of the copper oxide increases over time. Copper oxide has a number of characteristics which, when combined, creates a hazard. First, the interface can be mechanically strong. Hence, once the terminal-to-copper wire connection is made through the copper oxide, the connection may become permanent. Second, copper oxide is a semiconductor that has a very high negative resistance-versus-temperature characteristic between about 180° C. and about 250° C. Over this temperature range, the resistance decreases as much as five orders of magnitude. As the connection heats, the current tends to concentrate into a relatively narrow region, thereby resulting in a very high current density and temperature. For example, a temperature of about 1200° C. to about 1300° C. may result, which temperature is hot enough to melt, for example, a receptacle's plastic housing, but not the copper oxide. Then, as the terminal heats, the wire insulation begins to fail.

During a glowing contact fault in a receptacle, the copper wire reaches a glowing temperature value at which time the wire looks like an electric heater coil. First, the wire's insulation melts at the terminal and, then, slowly progresses away from the terminal toward other wires in the receptacle's outlet box. This can result in either an arcing fault or a ground fault if the bare glowing wire contacts another conductor. Second, the heat resulting from the glowing contact fault flows into the receptacle and causes the plastic housing of the receptacle to melt. As the plastic melts, the receptacle loses its mechanical integrity and, thus, the electrical isolation between conductors is compromised. This may ultimately lead to either a line-to-ground fault or a neutral-to-ground fault. In the event that the upstream protective device (e.g., a circuit breaker) does not respond, then the plastic could ignite.

FIGS. 2 and 3 show respective representations of visible and infrared photographs of glowing contacts GCV and GCIR.

Once a glowing contact is formed, the current during the formation of the glowing contact and the subsequent current flowing through the glowing contact is typically normal, since the voltage drop across a glowing contact is typically about 2 VAC. The existence of a glowing contact, therefore, is not reliably detectable by a conventional upstream current protective device (e.g., a conventional circuit breaker or fuse). However, significant damage may result to both the wire's insulation and the receptacle. On the other hand, if an upstream circuit breaker with both arc and ground fault protection is employed, then that circuit breaker will respond to arcing or a ground fault resulting from insulation damage caused by a glowing contact and will eventually trip in order to de-energize the branch circuit, thereby protecting the damaged wire and/or receptacle.

There exists the need to provide protection from a glowing contact in an electrical switching device, such as a receptacle, in order to provide protection should an upsteam branch circuit protective device not include arc and ground fault protection.

SUMMARY OF THE INVENTION

These needs and others are met by the present invention, in which dual temperature sensors output signals representative of the temperature of line and neutral circuits. A protection circuit then determines a difference between those two signals and provides a trip signal as a function of the difference.

As one aspect of the invention, an electrical switching device comprises: a line circuit having a first temperature; a neutral circuit having a second temperature; a load terminal; separable contacts adapted to electrically connect the line circuit and the load terminal; an operating mechanism for opening the separable contacts in response to a trip signal; a first temperature sensor outputting a first signal representative of the first temperature of the line circuit; a second temperature sensor outputting a second signal representative of the second temperature of the neutral circuit; means for determining a difference between the first and second signals; and means for providing the trip signal as a function of the difference.

The means for providing may comprise a comparator, which outputs the trip signal when the difference exceeds a predetermined value.

The line circuit may include a line terminal, and the first temperature sensor may be a diode disposed proximate the line terminal. The neutral circuit may include a neutral terminal, and the second temperature sensor may be a diode disposed proximate the neutral terminal.

The means for determining a difference may comprise a first resistor, a second resistor, a third resistor, and a differential amplifier having a first input, a second input and an output. The first resistor is electrically connected between the first temperature sensor and the first input of the differential amplifier. The second resistor is electrically connected between the second temperature sensor and the second input of the differential amplifier. The third resistor is electrically connected between the output of the differential amplifier and one of the first and second inputs of the differential amplifier.

The means for providing may comprise a window comparator having a first reference, a second reference, an input inputting the difference, and an output having the trip signal, which is active when the difference is greater than the first reference or less than the second reference.

The window comparator may comprise a first diode; a second diode; a first comparator having a first input, a second input, and an output; and a second comparator having a first input, a second input, and an output. The first input of the first comparator inputs the first reference, the second input of the second comparator inputs the second reference, the second input of the first comparator and the first input of the second comparator input the difference, the first diode is electrically connected between the output of the first comparator and the output of the window comparator, the second diode is electrically connected between the output of the second comparator and the output of the window comparator.

The means for providing may comprise a window comparator having an input electrically connected with an output of the differential amplifier, a first reference voltage and a second reference voltage. The first and second reference voltages define a voltage window with the first reference voltage being above a nominal voltage of the differential amplifier and the second reference voltage being below the nominal voltage of the differential amplifier.

As another aspect of the invention, a trip circuit is for an electrical switching device including a line circuit having a first temperature, a neutral circuit having a second temperature, and a load terminal. The trip circuit comprises: a first temperature sensor outputting a first signal representative of the first temperature of the line circuit; a second temperature sensor outputting a second signal representative of the second temperature of the neutral circuit; means for determining a difference between the first and second signals; and means for providing the trip signal as a function of the difference.

As a further aspect of the invention, an electrical switching device comprises: a line terminal having a first temperature; separable contacts; a first conductor electrically connecting the line terminal and the separable contacts; a load terminal having a second temperature; a second conductor electrically connecting the separable contacts and the load terminal; an operating mechanism for opening the separable contacts in response to a trip signal; and means for providing the trip signal as a function of a difference between the first temperature and the second temperature.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
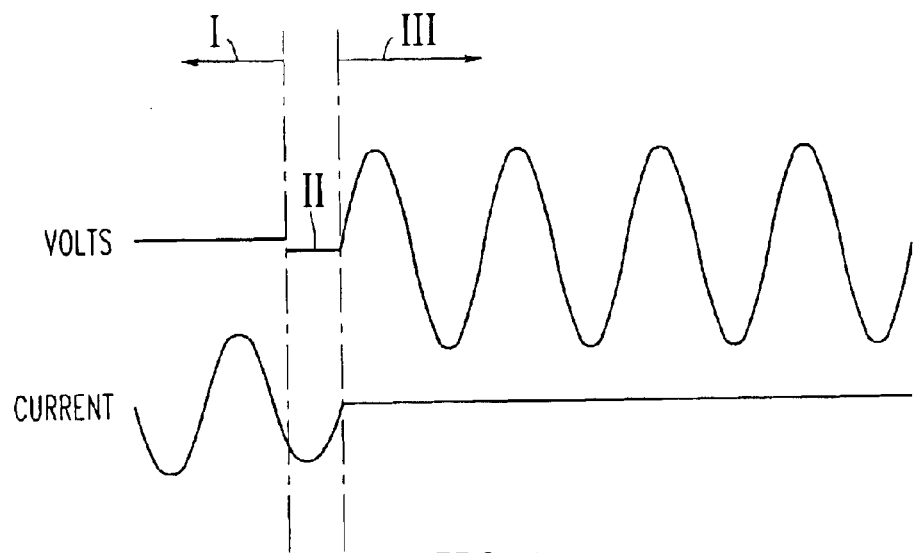
FIG. 1 is a plot of voltage and current versus time across a terminal-to-wire connection being broken while carrying current.
Figure 4:
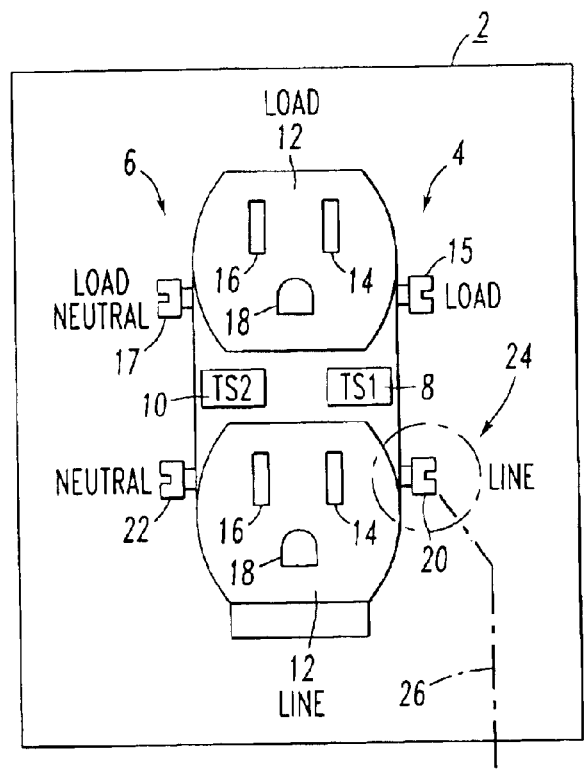
FIG. 4 is a front elevation view of a receptacle having a glowing contact in accordance with the present invention.
Figure 2:
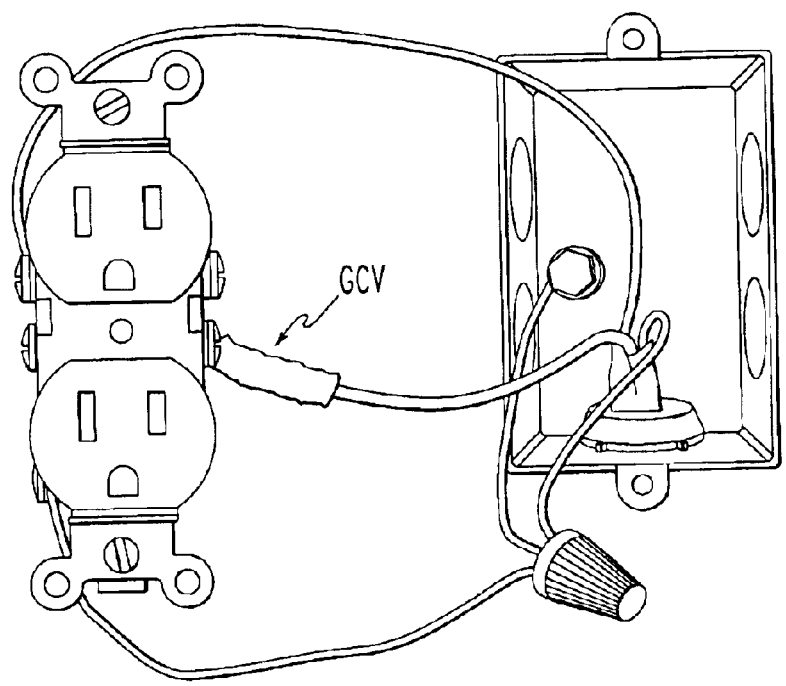
FIGS. 2 and 3 are representations of visible and infrared photographs, respectively, of a glowing contact.
Figure 3:
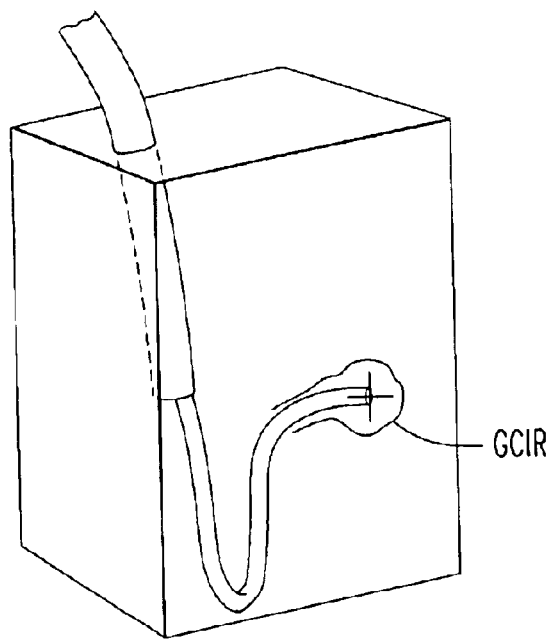

Referring to FIG. 4, an electrical switching device such as a receptacle 2 is shown. The exemplary receptacle 2 includes a line circuit 4 having a first temperature and a neutral circuit 6 having a second temperature. In accordance with the present invention, a first temperature sensor (TS1) 8 senses the first temperature of the line circuit 4, and a second temperature sensor (TS2) 10 senses the second temperature of the neutral circuit 6.

As is conventional, the receptacle 2 includes one or more three-conductor outlets 12 having female load, load neutral and ground terminals 14, 16, and 18, respectively. The receptacle 2 has separable contacts (not shown) (such as are employed in a ground fault receptacle) to allow breaking the line circuit and possibly the neutral circuit. In order to allow downstream or feed-through ground fault protection, separate screw terminals 15,17, which are directly electrically connected to the respective female terminals 14,16, are provided. The receptacle 2 also includes line and neutral screw terminal 20 and 22, respectively, for electrical connection to a suitable power line (e.g., 120 $V_{RMS}$) and load and load neutral screw terminals 15 and 17, respectively, for electrical connection to the load. Alternatively, or in addition to the screw terminals 15,17,20,22, any suitable terminal (e.g., without limitation, compression terminals) may be employed. Typically, one or more screw terminals (not shown) are provided for electrical connection to a suitable ground for the female ground terminals 18.

FIG. 4 shows a glowing contact 24 at the line terminal 20 of the receptacle 2 and a conventional copper conductor 26 (shown in phantom line drawing) for electrical connection to the power line. In this example, the metal components (not shown) in thermal contact with the line circuit 4, such as line terminal 20 and load terminal 15, run relatively very hot, and much hotter than the corresponding metal components (not shown) in the neutral circuit 6. It will be appreciated, however, that a glowing contact (not shown) may occur on the load terminal 15 or on the neutral terminals 17 or 22 of the receptacle 2. Hence, the metal components (not shown) in thermal contact with the neutral terminals 17 or 22 may run relatively very hot, and much hotter than the corresponding metal components (not shown) in the line circuit 4.

Figure 5:
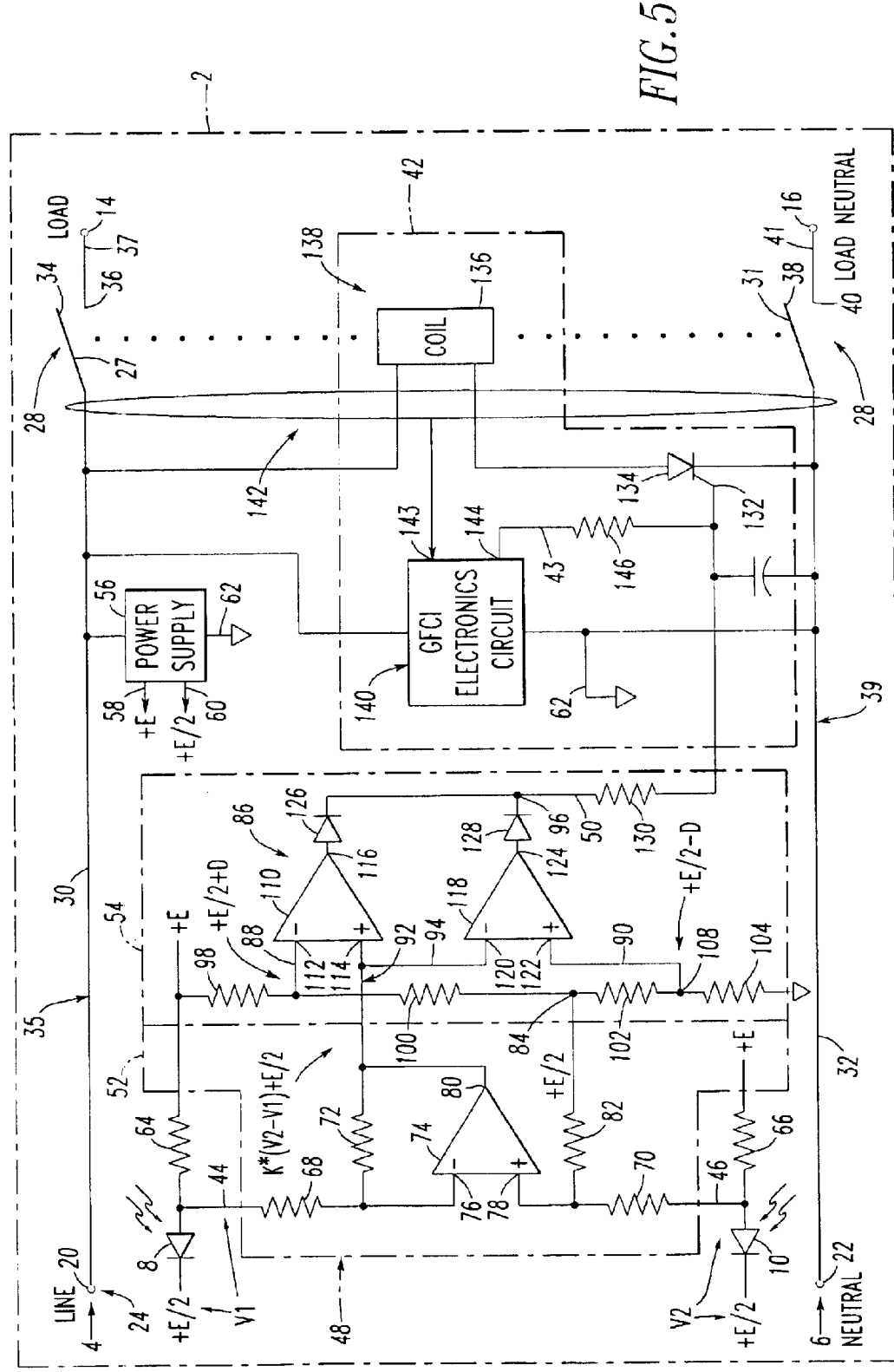
FIG. 5 is a block diagram in schematic form of the receptacle of FIG. 4.

FIG. 5 shows the block diagram of the receptacle 2 of FIG. 4. With the glowing contact 24 at the line terminal 20, the line components are at a relatively higher temperature than the temperature of the other neutral components. For example, as is conventional, the line components include the line terminal 20, first separable contacts 27 of a two-pole contactor 28, and all of the metal components (not shown) that form the line current path 30 through the receptacle 2 to the load terminal 14. Similarly, the neutral components include the neutral terminal 22, second separable contacts 31 of the two-pole contactor 28, and all of the metal components (not shown) that form the neutral current path 32 through the receptacle 2 to the load neutral terminal 16.

The first separable contacts 27 are electrically connected between the line terminal 20 and the load terminal 14. These first separable contacts 27 include a first contact 34, which is electrically connected by a first conductor 35 with the line terminal 20, and a second contact 36, which is electrically connected by a second conductor 37 with the load terminal 14. Similarly, the second separable contacts 28 include a first contact 38, which is electrically connected by a first conductor 39 with the neutral terminal 22, and a second contact 40, which is electrically connected by a second conductor 41 with the load neutral terminal 16. As is also conventional, the receptacle 2 includes an operating mechanism 42 for opening the contactor 28 and the first and second separable contacts 27,31 in response to a trip signal, such as the exemplary ground fault trip signal 43.

In accordance with the present invention, the first temperature sensor (TS1) 8 outputs a first signal 44 representative of the first temperature of the line circuit 4, the second temperature sensor (TS2) 10 outputs a second signal 46 representative of the second temperature of the neutral circuit 6, and a circuit 48 provides a glowing contact trip signal 50 as a function of a difference between the first temperature and the second temperature. The circuit 48 includes a first circuit 52, which determines a difference between the first and second signals 44,46, and a second circuit 54, which provides the glowing contact trip signal 50 as a function of that difference.

In the exemplary embodiment, a suitable power supply 56 is powered from the line and neutral circuits 4,6. The power supply 56 has two reference voltage outputs 58,60 with respect to a common reference output 62, which is electrically connected to the neutral circuit 6. The voltage (+E VDC) of the first reference voltage output 58 is preferably twice the voltage (+E/2 VDC) of the second reference voltage output 60, although any suitable reference voltage values may be employed. The first temperature sensor (TS1) 8 is a diode, which is disposed proximate the line circuit 4 (e.g., proximate line terminal 20), and the second temperature sensor (TS2) 10 is a diode, which is disposed proximate the neutral circuit 6 (e.g., proximate neutral terminal 22). First and second resistors 64,66 electrically connect the anodes of the diodes 8,10 to the first reference voltage output 58. The cathodes of the two diodes 8,10 are electrically connected to the second reference voltage output 60. The first and second diodes 8,10 have respective forward voltages V1,V2 and have a temperature coefficient of about −2 mV/° C.

If the glowing contact (not shown) is at terminal 15 or terminal 17, then as discussed, above, when the separable contacts (not shown) are closed, the temperature of all metal components of the line circuit 4 or neutral circuit 6, respectively, are essentially the same.

In the example shown in FIG. 5, with the glowing contact 24, the upper (with respect to FIG. 5) diode 8 runs hotter than the lower diode 10, since the upper diode 8 is physically closer to the glowing contact 24. For example, the voltage drop across a silicon diode, when biased at a constant current (e.g., such as diodes 8,10 as energized through respective resistors 64,66 from the voltage +E VDC), decreases at about 2 mV/° C. As a further example, a 30° C. diode temperature difference translates into an approximate 60 mV difference in voltage (i.e., V2−V1), wherein V1 is the voltage drop across the upper diode 8 and V2 is the voltage drop across the lower (with respect to FIG. 5) diode 10.

The circuit 52 includes a first resistor 68, a second resistor 70, a third resistor 72, and suitable differential amplifier 74 having a first input (−) 76, a second input (+) 78 and an output 80. The first amplifier input 76 is electrically interconnected through the first resistor 68 with the anode of the first diode 8. The second amplifier input 78 is electrically interconnected through the second resistor 70 with the anode of the second diode 10. The third resistor 72 is electrically connected between the amplifier output 80 and the first amplifier input (−) 76. A fourth resistor 82, which is electrically between a node 84 of the circuit 54 and the second amplifier input (+) 78, matches the impedance of the two amplifier inputs 76,78 and biases the voltage of the amplifier output 80 with respect to the voltage +E/2 VDC.

The value of K (as shown in FIG. 5) is equal to the resistance of resistor 72 divided by the resistance of resistor 68, assuming that resistors 72 and 82 have the same resistance, and assuming that resistors 68 and 70 have the same resistance. Hence, the resistors 68,70,72,82 are selected to provide a suitable gain (K) for the differential amplifier 74.

If the difference in sensed voltages of the diodes 8,10 (i.e., V2−V1) is amplified by the differential amplifier 74 with, for example, a gain of about K=10, and there is, for example, a 30° C. temperature difference between the diodes 8,10, which have a temperature coefficient of about 2 mV/° C., then the voltage (i.e., K*(V2−V1)+E/2) of the amplifier output 80 is about 600 mV+E/2 VDC. In the exemplary circuit 52 of FIG. 5, the amplifier inputs 76,78 and output 80 are referenced to the voltage +E/2 as supplied from the power supply 56. Hence, in this example, the voltage of the amplifier output 80 is about +600 mV above the voltage +E/2 VDC.

The circuit 54 includes a window comparator 86 having a first reference voltage 88, a second reference voltage 90, an input 92 inputting a difference signal 94 from the amplifier output 80, and an output 96 having the glowing contact trip signal 50. This trip signal 50 is active when the difference signal 94 is greater than the first reference voltage 88 or is less than the second reference voltage 90. The input 92 of the circuit 54 is electrically connected with the output 80 of the differential amplifier 74. The circuit 54 also includes four resistors 98,100,102,104, which are electrically connected in series between the first power supply output 58 (+E VDC) and the common reference output 62 to define the first reference voltage (e.g., +E/2+D) 88 at a node 106 between the resistors 98,100, the node 84 (e.g., having the voltage +E/2) between the resistors 100,102, and the second reference voltage (e.g., +E/2−D) 90 at a node 108 between the resistors 102,104. The first and second reference voltages 88,90 define a voltage window (e.g., +E/2±D) with the first reference voltage (e.g., +E/2+D) 88 being above the nominal voltage (e.g., +E/2) of the differential amplifier 74 and the second reference voltage (e.g., +E/2−D) being below the nominal voltage (e.g., +E/2) of the differential amplifier 74. The difference (D) between the first reference voltage (e.g., +E/2+D) 88 and the nominal voltage (e.g., +E/2) of the differential amplifier 80 is about equal to a difference (D) between the nominal voltage (e.g., +E/2) of the differential amplifier 80 and the second reference voltage (e.g., +E/2−D) 90. For example, if the difference (D) is set to about 600 mV, then the glowing contact differential temperature trip threshold is about 30° C. (i.e., 30° C.×2 mV/° C.×10=600 mV).

The window comparator 86 includes a first comparator 110 having a first input (−) 112, a second input (+) 114, and an output 116; a second comparator 118 having a first input (−) 120, a second input (+) 122, and an output 124, a first diode 126; and a second diode 128. The first input 112 of the first comparator 110 is electrically connected to the node 106 to input the first reference voltage (e.g., +E/2+D) 88. The second input (+) 122 of the second comparator 118 is electrically connected to the node 108 to input the second reference voltage (e.g., +E/2−D) 90. The second input 114 of the first comparator 110 and the first input 120 of the second comparator 118 are electrically connected to the input 92 to input the difference signal 94. The diodes 126,128 are electrically connected between the outputs 116,124 of the comparators 110,118, respectively, and the output 96 of the window comparator 86.

The input 92 of the exemplary window comparator 86 receives the voltage (i.e., K*(V2−V1)+E/2) of the amplifier output 80. That window comparator 86 employs a suitable voltage window of +/−D volts, as referenced to the voltage −E/2 (e.g., +E/2±D). For example, if D is set equal to 600 mV, and if the amplifier output 80 is slightly above D+E/2 volts, then this causes the output 116 of the first comparator 110 to go high. Current then flows through the associated diode 126 through a resistor 130 to the gate 132 of SCR 134, thereby turning the SCR 134 on, energizing a trip coil 136 of a trip solenoid 138 from the line circuit 4, and tripping or opening the separable contacts 27,31 of the receptacle 2. In turn, the line current in the line circuit 4 ceases, thereby causing the glowing contact 24 to cool to a safe temperature.

Otherwise, should the neutral terminal 22 be glowing, then the second diode 10 will be relatively hotter than the first diode 8. If there is a sufficient difference between the temperature of the circuits 6,4, then the amplifier output 80 is slightly below E/2–D volts, which causes the output 124 of the second comparator 118 to go high. Current then flows through the associated diode 128 through the resistor 130 to the gate 132 of SCR 134. In the same manner as discussed above, this trips open the separable contacts 27,31 of the receptacle 2 and causes the corresponding glowing contact (not shown) to cool to a safe temperature.

Hence, the circuit 54 includes the window comparator 86, which outputs the trip signal 50 when the difference signal 94 is greater than the first predetermined reference voltage 88 or when the difference signal 94 is less than the second predetermined reference voltage 90.

As is conventional, the operating mechanism 42 includes a ground fault trip circuit 140 powered from the line and neutral circuits 4,6. Examples of suitable ground fault trip circuits are disclosed in U.S. Pat. Nos. 4,081,852; 5,260,676; 5,293,522; and 5,889,643, which are incorporated by reference herein. An example of a ground fault receptacle (GFR) is disclosed in U.S. Pat. No. 3,878,435, which is incorporated by reference herein. The ground fault trip circuit 140 includes a ground current transformer 142 electrically connected to an input 143, and an output 144 having the ground fault trip signal 43. If there is a sufficient difference between the currents in the circuits 4,6, then the output 144 goes high. Current then flows through the associated resistor 146 to the gate 132 of SCR 134. In the same manner as discussed above, this current trips open the separable contacts 27,31 of the receptacle 2, thereby interrupting the ground fault current.

When the separable contacts 27 are closed, the low thermal impedance across those contacts will result in the line input terminal 20 and the load output terminal 15 (FIG. 4) being close to the same temperature. Also, when the separable contacts 31 are closed, the neutral input terminal 22 and load neutral output terminal 17 (FIG. 4) will be close to the same temperature. Thus, while there are typically four terminals 15,17,20,22 involved, only two temperature sensors 8,10 are required. A glowing contact is not a problem when the separable contacts 27,31 are opened, as there is no current. As an alternative, it is possible, if desired, to employ a temperature sensor for each terminal. In this case, the temperature comparison may be made between the maximum and minimum terminal temperatures of the various terminals.

Figure 6:
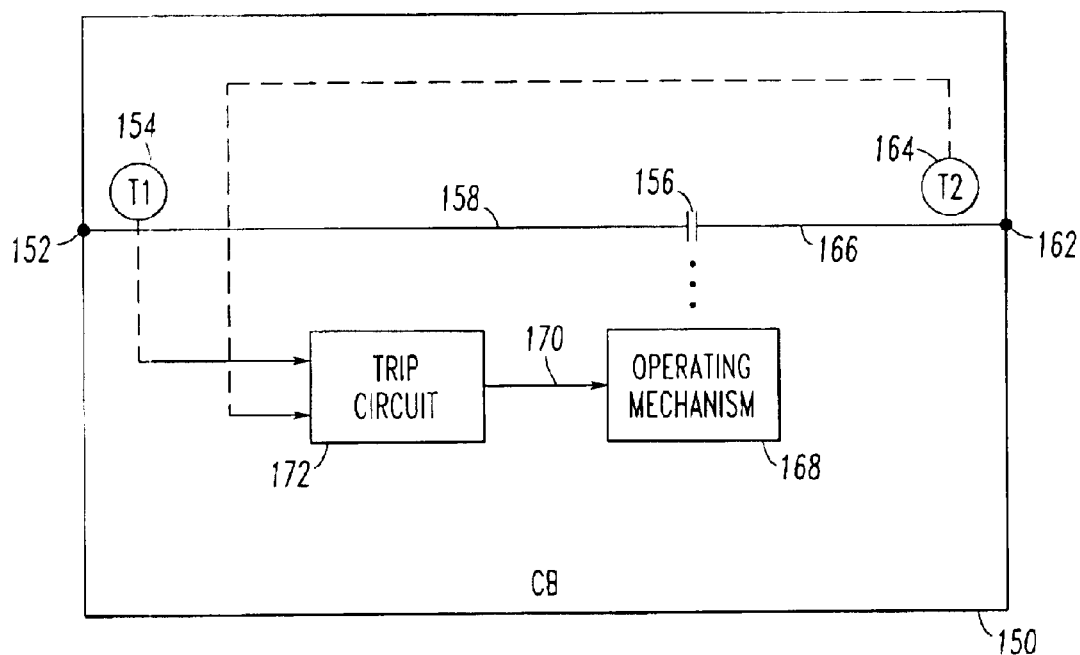
FIG. 6 is a block diagram of a circuit breaker in accordance with another embodiment of the invention.

Referring to FIG. 6, an electrical switching device, such as circuit breaker (CB) 150, includes a line terminal 152 having a first temperature (T1) 154, separable contacts 156, and a first conductor 158 electrically connecting the line terminal 152 and the separable contacts 156. The circuit breaker 150 also includes a load terminal 162 having a second temperature (T2) 164, and a second conductor 166 electrically connecting the separable contacts 156 and the load terminal 162. An operating mechanism 168 opens the separable contacts 156 in response to a trip signal 170. A trip circuit 172 provides the trip signal 170 as a function of a difference between the first temperature 154 and the second temperature 164. The trip circuit 172 may be similar to the circuit 48 of FIG. 4.

In this example, the line circuit components 158,156,166 normally tend to be at the same temperature and, hence, only two measurements of the temperatures 154,164 are employed. If a neutral circuit (not shown) is also employed, with a second set of separable contacts (not shown) being electrically connected between neutral and load neutral terminals (not shown), then the temperatures of all four terminals (e.g., line, load, neutral and load neutral) are measured and compared for maximum and minimum terminal temperatures.

The present invention may be employed, for example, at the line and load terminals of a circuit breaker, such as CB 150. If, for example, the circuit breaker separable contacts 156 are in relatively poor condition resulting in a relatively high electrical and thermal resistance, then there could be a significant difference between the temperatures of the line and load terminals 152,162. Hence, tripping on this condition is desirable.

The present invention provides a solution to the glowing contact problem. Although exemplary values of K (e.g., without limitation, 10) and D (e.g., without limitation, 600 mV) are disclosed, it will be appreciated that a wide range of such values may be employed based upon the desired glowing contact temperature difference sensitivity.

The inclusion of glowing contact protection in the exemplary receptacle 2 including a ground fault circuit interrupter (GFCI) is described, although the invention is applicable to electrical switching apparatus, which do not include a GFCI or which include other trip circuits, such as, for example, an arc fault circuit interrupter (AFCI). An arc fault plus ground fault protector responds to a characteristic of a glowing contact, which may cause an arcing fault and/or a ground fault.

Although an exemplary receptacle 2 is shown, the invention is applicable to a wide range of wiring devices including, but not limited to, electrical switching apparatus, circuit switching devices, circuit interrupters, circuit breakers, contactors, motor starters, motor controllers, other load controllers, GFCIs, AFCIs, ground fault and/or arc fault switches, ground fault and/or arc fault receptacles (GFRs/AFRs), and cord-mounted or plug-mounted ground fault and/or arc fault protection devices.

An important feature of the exemplary design is the fact that it is responsive to temperature differences, not absolute temperature. This is important in applications such as, for example, relatively hot, outside receptacles, which are heated by the sun.

Although analog circuits 48,52,54 are disclosed, it will be appreciated that one or more functionally equivalent digital circuits may be employed.

Although a two-pole contactor 28 is disclosed, the invention is applicable to electrical switching apparatus having a single set of separable contacts between, for example, a line terminal and a load terminal, or a three-pole three-phase configuration.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electrical switching device comprising:
    a line circuit having a first temperature;
    a neutral circuit having a second temperature;
    a load terminal;
    separable contacts adapted to electrically connect said line circuit and said load terminal;
    an operating mechanism for opening said separable contacts in response to a trip signal;
    a first temperature sensor outputting a first signal representative of the first temperature of said line circuit;
    a second temperature sensor outputting a second signal representative of the second temperature of said neutral circuit;
    means for determining a difference between the first and second signals;
    means for providing said trip signal as a function of said difference, and
    wherein said means for determining a difference comprises a first resistor, a second resistor, a third resistor, a fourth resistor, and a differential amplifier having a first input, a second input and an output, said first resistor being electrically connected between said first temperature sensor and the first input of said differential amplifier, said second resistor being electrically connected between said second temperature sensor and the second input of said differential amplifier, said third resistor being electrically connected between the output of said differential amplifier and one of the first and second inputs of said differential amplifier; wherein said first and second temperature sensors have a common reference; and wherein said fourth resistor is electrically connected between the other of the first and second inputs of said differential amplifier and said common reference.

2. An electrical switching device comprising:
    a line circuit having a first temperature;
    a neutral circuit having a second temperature;
    a load terminal;
    separable contacts adapted to electrically connect said line circuit and said load terminal;
    an operating mechanism for opening said separable contacts in response to a trip signal;
    a first temperature sensor outputting a first signal representative of the first temperature of said line circuit;
    a second temperature sensor outputting a second signal representative of the second temperature of said neutral circuit;
    means for determining a difference between the first and second signals;
    means for providing said trip signal as a function of said difference, and
    wherein said means for providing comprises a window comparator having a first reference, a second reference, an input inputting said difference, and an output having said trip signal, said trip signal being active when said difference is greater than the first reference or less than the second reference.

3. The electrical switching device as recited in claim 2, wherein said window comparator comprises a first diode; a second diode; a first comparator having a first input, a second input, and an output; and a second comparator having a first input, a second input, and an output, the first input of said first comparator inputting said first reference, the second input of said second comparator inputting said second reference, the second input of said first comparator and the first input of said second comparator inputting said difference, said first diode being electrically connected between the output of said first comparator and the output of said window comparator, said second diode being electrically connected between the output of said second comparator and the output of said window comparator.

4. An electrical switching device comprising:
    a line circuit having a first temperature;
    a neutral circuit having a second temperature;
    a load terminal;
    separable contacts adapted to electrically connect said line circuit and said load terminal;
    an operating mechanism for opening said separable contacts in response to a trip signal;
    a first temperature sensor outputting a first signal representative of the first temperature of said line circuit;
    a second temperature sensor outputting a second signal representative of the second temperature of said neutral circuit;
    means for determining a difference between the first and second signals;
    means for providing said trip signal as a function of said difference,
    wherein said means for determining a difference comprises a differential amplifier having a first input electrically interconnected with said first sensor, and a second input electrically interconnected with said second sensor; and
    wherein said differential amplifier comprises an output having a nominal voltage; and wherein said means for providing comprises a window comparator having an input electrically connected with the output of said differential amplifier, a first reference voltage and a second reference voltage, said first and second reference voltages defining a voltage window with the first reference voltage being above the nominal voltage of said differential amplifier and the second reference voltage being below the nominal voltage of said differential amplifier.

5. The electrical switching device as recited in claim 4 wherein a first difference between the first reference voltage and the nominal voltage of said differential amplifier is about equal to a second difference between the nominal voltage of said differential amplifier and the second reference voltage.

6. The electrical switching device as recited in claim 5 wherein said first and second differences are about 600 mV.

* * * * *